United States Patent Office 3,322,727
Patented May 30, 1967

3,322,727
POLYPYRROLIDONES CONTAINING A MIXTURE OF N-METHYLOL AND N-METHOXYMETHYL GROUPS AND PROCESS FOR PREPARATION
Max Eugene Chiddix, Easton, Pa., and James Louis McPherson, Midlothian, Ill., assignors to General Aniline & Film Corporation, New York, N.Y., a corporation of Delaware
No Drawing. Filed June 10, 1964, Ser. No. 374,149
14 Claims. (Cl. 260—72)

The present invention relates to polypyrrolidones containing a mixture of N-methylol and N-methoxymethyl groups and a process for their preparation. It has particular reference to the preparation of polymers of the "nylon 4" type which have specific solubility in water and in alcohol and which are capable of being cross-linked to form insoluble products.

In the prior art various suggestions have been made for incorporating individual N-methylol groups into polypyrrolidones and suggestions have also been made for the incorporation of N-methoxymethyl derivatives into such compositions. Other than accidental and undesirable small quantities of N-methylol groups which may have been introduced inadvertently in the preparation of N-methoxymethyl nylon 66, it is believed that no successful attempts have been made in the past to incorporate both the N-methylol and N-methoxymethyl groups by N substitution into compounds of this general character.

According to the present invention both the N-methylol and the N-methoxymethyl groups may be incorporated into polypyrrolidone by the reaction of such polypyrrolidone with formaldehyde and with alcohol in the presence of water under certain carefully chosen conditions. The process may be carried out and the polymer compositions of this invention may be prepared by either one step or two step procedures. In the one-step method the polymer is heated with 10 to 90% aqueous alcohol and with about 0.5 to about 5 parts of formaldehyde for each part of polypyrrolidone. The temperature of treatment is preferably between about 120 and 180° C., although a wider temperature range between 85 and 200° C. can be used. The pH should be maintained between 3 and 10, preferably between about 3.5 and 8. The pH can be adjusted with an inorganic base such as NaOH, $Na_2CO_3$, $NaHCO_3$, $Na_3PO_4$ or an organic tert-amine base such as pyridine, triethanolamine or triethylamine. It can also be held in a desirable range by using buffer salts. The formaldehyde concentration, when combined with aqueous alcohol, may be between about 10 and 50%. For the one-step process, heating is continued until the desired amount of substitution is obtained. The more stringent the conditions of treatment the greater the degree of substitution of the amide groups by either or both methylol and methoxymethyl groups. The ratio of these two groups may be varied by the ratio of water to alcohol.

As shown in the Examples and in Tables I and II, a variety of polymers substituted to different degrees by N-methylol and N-methoxymethyl groups may be prepared. The reaction of N-methoxymethyl polypyrrolidone with the aqueous formaldehyde solution will also produce the N-methylol-N-methoxymethyl polypyrrolidone polymers of this invention.

A two step process, which may be preferable under certain circumstances, consists in first preparing N-methylol polypyrrolidone under the conditions outlined above but omitting the alcohol. After the first substitution is complete, formaldehyde being present, the methyl alcohol is added to the reaction mixture and heating is continued at a temperature ranging between about 90° and 200° C., preferably between 120° and 180° C. This treatment results in converting part of the methylol groups to the N-methoxymethyl groups. Here again, the ratio of alcohol to water in the reaction mixture will largely determine the ratio of N-methylol substituent to N-methoxymethyl substituent. The new methods of this invention avoid the inherent degradation of the polyamide which occurs when the polymer is heated in the presence of an acid in methods known in the prior art. Thus the prior art methods which use formic acid, for example, have disadvantages which are avoided by the present procedure. The product obtained by this method is free of color and has very little, if any, degradation as measured by the relative viscosity of the polymer.

The procedures described above are effective to convert many of the amide groups of the polyamide to N-methylol groups and N-methoxymethyl groups:

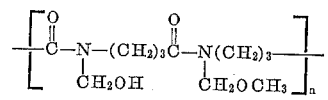

It is, therefore, an object of the present invention to substitute in the polypyrrolidone N-methylol and N-methoxymethyl groups which will give the polymer certain highly desirable properties not found in any of the singly substituted polymers of the prior art.

For example, the polymer produced according to the present invention is water-soluble and alcohol soluble and the degree of solubility may be quite accurately controlled. The product forms clear and very tough to rubbery films which can easily be insolubilized after formation by acid cross-linking. The percentage of N substitution by N-methylol may range from 1 to 80%, preferably between about 5 and 30% for most purposes. Likewise, the percentage of N substitution by N-methoxymethyl groups may at the same time range from 80% down to 1%, preferably within the range of about 25% to 5% for most uses.

The degree of water or alcohol solubility may be controlled by the conditions of treatment. Solubility may be as little as 0.5 or 1 gram of polymer per 100 cc. of water to greater than 100 grams of polymer per 100 cc. of water. In 95% ethyl alcohol (aqueous) the solubility may range from as low as 1 gram per 100 cc. to as much as 50 grams per 100 cc. of the alcohol.

The presence of the N-methylol group apparently enables the polymer to be rapidly cross-linked at much milder conditions than when the polymer contains only the N-methoxymethyl groups. Any remaining N-methylol groups after cross-linking may be easily removed by exposing the polymer to an alkaline pH or by heating above 110° C. Both the alkaline pH and the heating may be used if desired. The more stable N-methoxymethyl groups are retained under such conditions. Hence the polymer keeps its water absorption properties to a good degree. It also retains its good feel and its excellent anti-static properties. A particular advantage of films or sheets prepared from these materials is their good water absorption properties and the comfortable surface feel which is similar to that of leather and in sharp conttrast to the feel of the unmodified polyamides common in the prior art.

Compositions made according to this invention have excellent anti-static properties. These properties are shown by the fact, for example, that Dacron textiles coated with N-methylol N-methoxymethyl substituted materials, in excess of 1% substitution in each case, will give a resistivity (log ohm per sq.) of about 11 at 40% relative humidity. This is better than the anti-static properties of normally processed cotton fabrics. The greater ease and greater degree of cross-linking due to the N-methylol group makes the material suitable for a fabric coating which is resistant to removal in washing cycles, as tested in standard washing machine tests.

These modified polymeric materials, with their excellent cross-linking and anti-static properties, are particularly useful as coatings on fabrics or floor coatings and as binding agents in artificial leathers. They are useful also in nylon paper where they may replace the presently used N-methoxymethyl nylon-6,6.

These products may be cast or formed into various articles such as sheets, fibers and other forms and then readily cross-linked by acid treatment. The ease of cross-linking of the N-methylol group is shown by the fact that it can be linked in the presence of formic acid in a few minutes at room temperatures. By contract, the N-methoxymethyl group requires treatment at a temperature of 100° C. or more for a similar cross-linking reaction. Cross-linking of the products of this invention can also be accomplished by warming with a small proportion of dibasic acid such as maleic, fumaric, oxalic, succinic, adipic, phthalic, or azelaic acid.

In addition to the uses suggested above, these materials may be used as adhesives which are very strongly bonded to most materials including glass. The highly substituted materials are particularly suitable for this person. They may be used as bonding agents in general, as coatings for rayon cords having high abrasion resistance, high melting points and other properties typical of nylon. They may be used as protective coatings for fabrics, for example on various cloths, tentage and the like and as tear strength additives for resin treated rayons. They are useful also as coatings for leather, paper, etc., to give surface properties similar to that of nylon and they may be used as internal binding agents for artificial leathers, nylon papers, etc., to give added strength as suggested above. Gaskets may be molded of these materials, particularly the highly substituted products with melting points somewhat lower than the decomposition point of the polymer, which is usually above about 120° C.

The materials are useful as dye carriers for coating fabrics and glass fibers and for coating nylon materials in general. They may be used as coatings on nylon hose to give better feel, greater strength and superior water absorption properties. They are useful as backings for upholstery and as warp sizes for nylon, Dacron and similar threads and fibers. They may also be used to make foamed plastic compositions. As a matter of fact, they are self-foaming when the highly substituted products are placed in molds and heated above a temperature of 120° C. They can be foamed also at lower temperatures under suitable vacuum.

These products also may be spun into fibers from the concentrated aqueous solutions or from other solvents such as formic acid and the like. Fibers so formed are tough but somewhat more elastic than normal nylon.

The invention will be more fully understood by reference to the following specific examples.

EXAMPLE 1

To a 1000 ml. stainless steel autoclave equipped with a stirrer, a cold finger, and an external heating unit was added 41.7 parts of polypyrrolidone (having a relative viscosity of 2.24 measured as 0.5% in meta-cresol), 125 parts of formaldehyde in water (310 parts of 36.86% aqueous solution) and 217 parts of methanol. The mixture was heated at 140° C. for 16 minutes. The clear liquid reaction product with a pH of 5.4 was poured into acetone. The precipitate was collected and dried at 60° C. for 17 hours at 1 mm. to give 42.8 parts of a white solid with a methylol content of 2.6% by weight which corresponds to a substitution of 16% of the nitrogen atoms. The precentage of $CH_3O$ was 2.2 which corresponds to a substitution of about 6% of the nitrogen atoms with methoxymethyl groups. The solubility in water was 1 g./100 g. water. The relative viscosity was 2.18 (measured as 0.5% in meta-cresol), the stick point, 154° C., and the M.P., 250° C. The stick point was determined by heating a metal block and noting the temperature at which the polymer would adhere to it on contact.

EXAMPLE 2

To a 1000 ml. stainless steel autoclave equipped with a stirrer, cold finger, and an external heating unit was added 41.7 parts of polypyrrolidone ($\eta_{rel.}$=2.24 measured as 0.5% in m-cresol), 125 parts of para-formaldehyde, 100 parts of water and 360 parts of methanol. The mixture was heated at 180° C. for 16 minutes. The reaction product was a white mush with a pH of 6.2. Upon pouring into 1 liter of acetone there was precipitated 37 parts of a white solid with a methylol ($CH_2OH$) content of 0.9 which corresponds to less than 6% substitution of the nitrogen atoms and a percentage of $CH_3O$ of 3.2% which corresponds to an 8.8% substitution of the nitrogen atoms by methoxymethyl groups. The solubility in water was 100/100 g. hot water. The relative viscosity was 1.76 (measured as 0.5% in meta-cresol). The M.P. was 250–155° C. and the stick point was 190° C.

EXAMPLE 3

The product of this example was prepared by the two step method. To a 1000 ml. three-necked, round bottom flask equipped with a stirrer and condenser, and heated on a steam bath was added 186 parts of formaldehyde dissolved in 275 parts of water and 41.7 parts of polypyrrolidone ($\eta_{rel.}$=2.24 measured as 0.5% in m-cresol). The mixture was heated at 100° C. for 4 hours. The resulting clear solution was mixed with 320 parts of methanol and divided into two equal parts. One part (A) with a pH of 4.8 was heated for 20 hours at 87° C. The clear solution of (A) was poured into 1 liter of acetone, and the precipitated polymer was dried at 60° C. for 17 hours at 1 mm. pressure to give 19.0 parts of a while solid. The percentage by weight of $CH_2OH$ was 0.7 which corresponds to about 5% substitution of the nitrogen atoms. The percentage $CH_3O$ was 3.43 which corresponds to 9.2% substitution of the nitrogen atoms by methoxymethyl groups. The solubility was 50 g./100 g. hot water. The M.P. was 252° C., the stick point was 239° C., and the relative viscosity was 2.21 (measured as 0.5% in meta-cresol).

The other half (B) of the solution was made alkaline (pH=8.4) with the addition of 20 parts of triethanolamine and was heated at 87° C. for 20 hours. A partial gel resulted. This partial gel was mixed with 1 vol. of water and filtered while hot. The filtrate was poured into 1 liter of acetone and the white precipitate which resulted was dried at 60° C. for 17 hours at 1 mm. pressure to give 11.3 parts of product. The percentage by weight of $CH_2OH$ was 1.2 which corresponds to about 8% substitution of the nitrogen atoms. The percentage $CH_3O$ was 0.23 which corresponds to about 1.2% substitution of the nitrogen atoms. The solubiltiy was less than 2 g./100 g. hot water, the M.P. was 252° C., the stick point was 171° C., and the relative viscosity was 2.47 (measured as 0.5% in meta-cresol).

EXAMPLE 4

To a 1000 ml. three-necked, round bottom flask equipped with a stirrer, condenser, and heated on a steam bath was added 63 parts of N-methoxymethyl polypyrrolidone with 9.59% $CH_3O$, 186 parts of formaldehyde in 318 parts of water (461 parts by volume of commercial 36.86% aqueous formaldehyde solution) and 20 parts of triethanolamine. The solution was heated at 100° C. for 15 minutes (pH=7.2) and after cooling was poured into 1 liter of acetone and the precipitated polymer dried at 60° C. for 17 hours at 1 mm. pressure to give 41.4 parts of a tough somewhat rubbery ivory colored polymer. The solubility was 200 g./100 g. cold water, and the M.P. was 125° C. (decomposition with gas evolution). The stick point was 25° C. The polymer contained 8.0% $CH_2OH$ which corresponds to a substitution of about 44% of the nitrogen atoms and 5.3% $CH_3O$ which corresponds to a substitution of about 15.3% of the nitrogen atoms.

*Analytical methods.*—The free $CH_2O$ was determined first by treating a solution of the polymer in 50% aqueous methanol with dimethyldihydroresorcinol followed by titration of the excess reagent with NaOH.

The combined formaldehyde (—$CH_2OH$) was determined by treating a solution of the polymer in 50% aqueous methanol with Tollen's Reagent and subtracting the free formaldehyde previously determined from the total.

EXAMPLE 5

To a 1000 ml. three-necked, round bottom flask equipped with a stirrer and condenser, and heated on a steam bath was added 41.7 parts of N-methoxymethyl polypyrrolidone with 10.08% $CH_3O$, 40 parts of triethanolamine, and 186 parts of formaldehyde in 318 parts of water (461 parts by volume of commercial 36.86% aqueous formaldehyde solution). The solution was heated at 50° C. for 1 hour. The solution was poured into 1 liter of acetone and the precipitated polymer dried at 60° C. for 17 hours at 1 mm. pressure to give 35.3 parts of a white solid. This polymer contained 3.0%—$CH_2OH$ which corresponds to a substitution of about 19% of the nitrogen atoms, and 8.3%—$CH_3O$—which corresponds to a substitution of about 27% of the nitrogen atoms. The solubility was 100 g./100 g. of water, the M.P. was 125° C. (decomposition with gas evolution) and the stick point was 40–45° C.

EXAMPLE 6

To a 1000 ml., three-necked, round bottom flask equipped with a stirrer and condenser, and heated on a steam bath was added 26 parts of polypyrrolidone ($\eta_{rel.}$ = 2.24 measured as 0.5% in meta-cresol), 117 parts of formaldehyde in 200 parts of water (288 parts by volume of a 36.86% aqueous solution). The mixture was heated on a steam bath till solution occurred in 1 hour. A small sample was withdrawn and analysis showed that the mixture contained 23 parts of N-methylol polypyrrolidone with 6.2% by weight of $CH_2OH$ which corresponds to a substitution of 36% of the nitrogen atoms. To the reaction mixture was added 180 parts of methanol and the mixture heated at reflux for 2 hours. The reaction product was poured into acetone and the precipitate dried at 60° C. for 17 hours at 1 mm. to give 20 parts of a white powder wth a percentage by weight of $CH_2OH$ of 4.7 which corresponds to a substitution of 27.5 of the nitrogen atoms. The percentage $CH_3O$ was 2.2 which corresponds to a substitution of 6% of the nitrogen atoms. The solubility was 100 g./100 g. of water; the relative viscosity was 1.91 (measured as 0.5% in meta-cresol); the M.P. was 260° C. (decomp.), and the stick point was 105° C.

ADDITIONAL EXAMPLES

Below there are tabulated in Tables I and II respectively, two general methods of preparing the products of this invention under various conditions. Table I shows a group of products as prepared without the use of catalyst, outlining their general properties. Table II shows products prepared from N-methoxymethyl polypyrrolidone using triethanolamine catalyst in varying quantities. It will be noted that Table I shows also the effects of varying the quantity of water used with the methyl alcohol.

It will be understood that various modifications may be made in the process consistent with the various examples and perameters given above and it is intended by the claims which follow to cover such as far as the prior art properly permits.

What is claimed is:

1. The method of producing a mixed N-methylol, N-methoxymethyl polypyrrolidone which comprises reacting a polypyrrolidone with formaldehyde and with methyl alcohol in the presence of water while heating to a temperature within the general range of about 85° to 200° C. while maintaining a pH level between about 3.0 and 10.0

2. Method according to claim 1 wherein the reaction with formaldehyde and the reaction with alcohol are carried out concurrently.

3. Method according to claim 1 wherein the reaction with formaldehyde and the reaction with alcohol are carried out sequentially.

4. Method according to claim 3 wherein the reaction with formaldehyde is carried out first.

5. Method according to claim 1 wherein the proportions of formaldehyde to polypyrrolidone are between 0.5 and 5 parts by weight.

TABLE I.—N-METHYLOL, N-METHOXYMETHYL POLYPYRROLIDONE

| Ex. No. | Parts [16] $CH_2O$:PP [1] | Parts $H_2O$:MeOH [2] | Temp. [3] | Time [3] | pH [4] | Visc. [5] | Percent $CH_2OH$ [6] | Percent $CH_3O$ [7] | M.P. [8] | S.P. [9] | Solubility [10] | Parts Product |
|---|---|---|---|---|---|---|---|---|---|---|---|---|
| 7 | 186:41.7 | 318:318 | 87 | 24 hr | | | [12] | [12] | | | 1 | 40 |
| 8 | 186:41.7 | [11] 318:318 | [11] 100 | 20 hr | 8.2 | 2.47 | 1.2 | 0.23 | 260 | 239 | 2 | 39 |
| 9 | 186:41.7 | 318:318 | 100 | 20 hr | 4.8 | 2.21 | 0.7 | 3.48 | 252 | 171 | 50 | 38 |
| 10 | 125:41.7 | 217:217 | 100 | 17 hr | 5.6 | | [12] | [12] | | | 1 | 42 |
| 11 | 125:41.7 | 217:217 | 140 | 16 min | 5.4 | 2.18 | 2.6 | 2.2 | 250 | 154 | 2 | 43 |
| 12 | 125:41.7 | 217:217 | 180 | 16 min | 4.7 | 1.57 | 2.0 | 3.2 | 258 | 178 | 30 | 52 |
| 13 | 125:41.7 | 100:360 | 180 | 16 min | 6.2 | 1.76 | 0.9 | 3.2 | 250 | 190 | 100 | 37 |
| 14 | 125:41.7 | 417:360 | 180 | 16 min | 6.1 | 1.76 | 0.9 | 1.2 | | | 30 | 37 |

TABLE II.—N-METHYLOL, N-METHOXYMETHYL POLYPYRROLIDONE (TRIETHANOLAMINE CATALYST)

| No. | Parts $CH_2O$ [16]: N-Methoxymethyl P.P. | Parts Catalyst | Temp. [3] | Time [3] | pH [4] | Percent $CH_2OH$ [6] | Percent $CH_3O$ [7] | M.P. [8] | S.P. [9] | Solubility [10] | Parts Product |
|---|---|---|---|---|---|---|---|---|---|---|---|
| 15 | [13] 186:63 | 20 | 100 | 15 min | 7.2 | 8.0 | 5.3 | [15] | 25 | 200 | 41 |
| 16 | [14] 186:41.7 | 40 | 50 | 1 hr | 8.5 | 3.0 | 8.3 | [15] | 40–45 | 100 | 35 |
| 17 | [14] 186:41.7 | 40 | 23 | 3 hr. 40 min | 8.5 | 0.3 | 8.5 | [15] | 125 | 100 | 32 |

[1] Parts by weight of formaldehyde and polypyrrolidone, respectively, used in each example.
[2] Parts by weight of water and methanol, respectively.
[3] Reaction temperature, ° C., and reaction time.
[4] The pH of the reaction mixture at the end of the reaction.
[5] The relative viscosity measured at 0.5% in m-cresol.
[6] Analysis of product for methylol groups.
[7] Analysis of product for methoxy groups.
[8] Melting point, ° C.
[9] Stick point, ° C. The temperature at which a piece of the polymer sticks to a heated block.
[10] Solubility of product in water expressed in grams/100 grams water. Solubility at 80° C. for Table I and 25° C. for Table II.
[11] MeOH was added after 3 hours at 100° C. during which time N methylol polypyrrolidone was formed and the reflux temperature dropped from 100° to 87° C. upon addition of the alcohol.
[12] Less than 5% of the Nitrogen atoms are substituted.
[13] The N-methoxymethyl polypyrrolidone had 9.6% $CH_3O$.
[14] The N-methoxymethyl polypyrrolidone had 10.1% $CH_3O$.
[15] Foam begins at 95–110° and polymer gradually darkens in color as temperature reaches 260° C.
[16] Unless otherwise specified, the formaldehyde was used as a 38% aqueous solution.

6. Method according to claim 1 wherein the alcohol is 10–90% aqueous solution.

7. Method according to claim 1 wherein the temperature range is 120° to 180° C. and the PH is between 3.5 and 8.0.

8. Method according to claim 1 wherein the formaldehyde is mixed with aqueous methanol in concentration between about 10 and 50% by weight.

9. Method according to claim 9 wherein the formaldehyde concentration is between about 20 and 40%.

10. Method according to claim 9 wherein the ratio of formaldehyde to polypyrrolidone is between about 2 and 3 to 1.

11. As a new composition of matter, polypyrrolidone soluble in 95% aqueous ethyl alcohol to the extent of 1 to 50 grams per 100 cc., said polypyrrolidone containing a percentage of N substitution of 1 to 80% N-methylol and 80 to 1% N-methoxymethyl.

12. Composition according to claim 11 wherein there are substituted 5 to 30% of N-methylol groups.

13. Composition according to claim 11 wherein there are substituted 5 to 25% of N-methoxymethyl groups.

14. The method producing a mixed N-methylol-N-methoxymethyl polypyrrolidone which comprises reacting on N-methoxymethyl polypyrrolidone with formaldehyde in the presence of water while heating at a temperature in the range of 85° to 200° C. and maintaining a pH level between about 3.0 and 10.0.

No references cited.

WILLIAM H. SHORT, *Primary Examiner.*

H. T. ANDERSON, *Assistant Examiner.*